(12) United States Patent
Bush

(10) Patent No.: US 6,751,748 B1
(45) Date of Patent: Jun. 15, 2004

(54) CONTEXT REDUNDANCY SYSTEM ON A WIRELESS AND PACKET-BASED TELECOMMUNICATIONS NETWORK INTERFACE

(75) Inventor: Terry Bush, Parker, TX (US)

(73) Assignee: Nortel Networks Limited, St. Laurent (CA)

( * ) Notice: Subject to any disclaimer, the term of this patent is extended or adjusted under 35 U.S.C. 154(b) by 584 days.

(21) Appl. No.: 09/738,224

(22) Filed: Dec. 15, 2000

(51) Int. Cl.[7] ............................................... G06F 11/00
(52) U.S. Cl. ............................ 714/4; 455/445; 370/242
(58) Field of Search ...................... 714/4, 43; 709/239, 709/249; 370/242; 455/423, 424, 445, 428

(56) References Cited

U.S. PATENT DOCUMENTS

| | | | |
|---|---|---|---|
| 5,963,540 A | * 10/1999 | Bhaskaran | 370/218 |
| 6,148,410 A | * 11/2000 | Baskey et al. | 714/4 |
| 6,148,411 A | * 11/2000 | Ichinohe et al. | 714/4 |
| 6,222,820 B1 | * 4/2001 | Hamami | 370/218 |
| 6,324,161 B1 | * 11/2001 | Kirch | 370/217 |

OTHER PUBLICATIONS

Perkins, Charles E.; "Tutorial: Mobile Networking Through Mobile IP;" Jan. 1998; IEEE Internet Computing.
Perkins, C.; "RFC 2002: IP Mobility Support;" Oct. 1996; Networking Working Group.
La Porta, Thomas F., Luca Salgarelli and Gerald T Foster; "Mobile IP and Wide Area Wireless Data;" 1998; IEEE Internet Computing.

\* cited by examiner

*Primary Examiner*—Robert Beausoliel
*Assistant Examiner*—Christopher McCarthy
(74) *Attorney, Agent, or Firm*—Storm & Hemingway L.L.P.

(57) ABSTRACT

The present invention is a redundancy system in the interface between a wireless and packet-based telecommunications network. The redundancy system includes back-up support components coupled to hub broadcast routers. Because the back-up support component monitors all communications to the primary support component through the communications from the hub broadcast routers, the back-up support component can assume responsibility for the primary interface support component without excessive overhead in sending back-up file information to a redundant component.

23 Claims, 3 Drawing Sheets

Information) with various support nodes on the system. The
CONTEXT REDUNDANCY SYSTEM ON A WIRELESS AND PACKET-BASED TELECOMMUNICATIONS NETWORK INTERFACE

TECHNICAL FIELD OF THE INVENTION

A redundancy system in the interface between a wireless and packet-based telecommunications network.

BACKGROUND OF THE INVENTION

A typical cellular communication system is comprised of multiple cell sites covering an intended geographic region. Referring to FIG. 1, a wireless telecommunications system 15 communicates with a mobile unit, or Mobile Node $MN_1$ 65, via wireless communications signal 60. The cellular communications to $MN_1$ 65 are supported by at least one antenna 7, a transceiver $X_{AN}$ 9, and a base station transceiver substation 45 ("BTS").

The transceiver $X_{AN}$ 9 is coupled to the BTS 45 via signal line 10, and the transceiver $X_{AN}$ 9 is coupled to antenna 7 via signal line 8. Radio signal 60 represents the wireless signal transmitted from antenna 7 to Mobile Node $MN_1$ 65. The Mobile Node $MN_1$ 65 supports the voice and data communication from a subscriber, mobile unit user, or a mobile node in a particular cell cite service area.

The BTS 45, sometimes called the base station, provides wireless communications coverage within a cell site service area by performing base station processing to support the common air interface transmission to the Mobile Node $MN_1$ 65. Mobile Nodes $MN_1$ 65 in the cell site area communicate through the antenna 7 and transceiver 9 combination thereby supporting the radio communication to the BTS.

Looking at FIG. 1, the BTS 45 is coupled to the GPRS network 40 via signal line 43. The GPRS network 40 also includes a Serving GPRS Support Node $SN_1$ 59 and is coupled to the remainder of the GPRS network 40 via signal line 57. The GPRS network 40 also includes other Support Nodes $SN_n$ 55, which are coupled to the remainder of the GPRS network 40 via signal line 45. Support node $SN_1$ 59 is coupled to a Gateway GPRS Support Node $GN_1$ 72 via signal lines 60 and 61, respectively. Gateway Node $GN_1$ 72 is also part of the GPRS network 40 and is coupled to a Packet-Based Network 80 via signal line 74. The Patent-Based Network 80 can include the Internet or any other type of IP packet-based system. Further, the Packet-Based Network 80 can also include an interface to non-packet-based networks such as the Public Switchboard Telephone Network. In FIG. 1, GN 72 is the interface between the wireless telecommunications network 15 and the Packet-Based Network 80.

A more detailed view of various telecommunications networks can be seen in FIG. 2A. FIG. 2A shows a General Packet Radio Service (GPRS) wireless telecommunications network comprising a $GPRS_1$ network 140 coupled to a first Radio Access Network $RAN_1$ 130 via communication line 135. The RAN, 130 is coupled to transceiver $X_{AN1}$ 120 via communication line 125. The transceiver $X_{AN1}$ 120 communicates with a first Mobile Node $MN_1$ 110 via wireless communications signals 115.

The $GPRS_1$ network 140 comprises an Home Location Register Support Node (HLR) 144 coupled to the Servicing GPRS Support Node (SGSN) 142 via signal line 152. The $GPRS_1$ network 140 also comprises a Call Server Node (CSCF) 146 coupled to an Gateway GPRS Support Node (GGSN) 148 via signal line 160. The GGSN 148 is coupled to the SGSN 142 via signal line 150, and the CSCF 146 is coupled to the HLR 148 via signal line 152. A network interface $G_n$ 150 is located on signal line 151 between the GGSN 148 and the SGSN 142.

The $GPRS_1$ network 140 is coupled to an Internet Protocol/Multimedia (IP/MM) network 200 via signal line 165. An external interface $G_i$ 161 is located on signal line 161 between the GGSN 148 and the IP/MM 200. The GPRS, network 140 is also coupled to a Media Gateway MGW 180 via signal line 170. An external interface $G_i$ 171 is located on signal line 170 between the GGSN 148 and the MGW 180. The MGW 180 includes a Media Gateway Control Function (MGCF) Node 185 coupled to signal line 170 via signal line 190. The MGW 180 is coupled to a Public Switched Telephone Network (PSTN) 210 via a signal line 178. A PSTN telecommunications device 212 is located on the PSTN network 210, and the PSTN device 212 is coupled to the MGW 180 via signal line 178.

A second $GPRS_2$ network 235 is located on the Public Land Mobile Network (PLMN) 225. The PLMN 225 is coupled to the $GPRS_1$ network 140 via signal line 220. The $GPRS_2$ network 235 includes a second Gateway GPRS Support Node ($GGSN_2$) 230, as well as a second $HLR_2$ 232, $SGSN_2$ 233, and $CSCF_2$ 234. These elements in the $GPRS_2$ network are coupled to each other via signal lines 237 as shown in FIG. 2. The $GPRS_2$ network 235 in the PLMN 225 is coupled to a second radio access network ($RAN_2$) via signal line 240. The $RAN_2$ 245 is coupled to a transceiver $X_{AN2}$ 255 via signal line 250, and the $X_{AN2}$ 255 communicates with a second Mobile Node $MN_2$ 270 via wireless communication signals 260.

While represented in greater detail, the interface components between the wireless network and the packet-based network in FIG. 2 include the network interface $G_n$ 151, the GGSN 148 and the external interface $G_i$ 161 or $G_i$ 171. These interface components cooperatively translate communications in the wireless communications format (e.g. GPRS format) to the packet-based communications format, and vice versa.

Telecommunication networks can be complex networks that establish and maintain connections between two or more telecommunication devices. Because wireless communications transmitted on the wireless network are substantially different than the packet-based communications on the Packet-Based Network 80 shown in FIG. 1, an interface between these different systems plays a very important role in the effective performance of the system. During the transmission of communications on these systems, the user establishes context information (e.g. PDP Context Information) with various support nodes on the system. The GGSN 148 will assist the network in locating a system user and their network association. The context information on the system can include state information, identification information, and address information for a particular user during a communications session. The addressing and context information will support the transmission of information by providing necessary context information on routing and addressing. The GGSN will modify message formats and re-configure the communication signals based, in part, on this context information. If a nodal failure occurs at GGSN 148 or another support node, the context information will be lost without an effective redundancy scheme.

One redundancy scheme for a GGSN interface available in the prior art includes the system shown in FIG. 2B. In this system, signal line 295 is coupled to Router, 300, which in turn is coupled GGSN$_1$ 315 and its redundant GGSN$_1$' 345 via signal lines 310 and 335, respectively. The GGSN$_1$ 315 and its redundant GGSN$_1$' 345 are coupled to Router$_2$ 355 via signal lines 320 and 350, respectively. Router$_2$ 355 is coupled to signal line 360. Signal lines 295 and 360 transmit and receive communication signals on the Router$_1$ 300 and Router$_2$ 355.

Each router will use GGSN$_1$ 315 as its main GGSN unless, or until, there is a support node malfunction, nodal failure, or shut-down of this support node. During normal operations, the GGSN$_1$ 315 will retain the context information for communications transmitted through the interface shown in FIG. 2B. The GGSN$_1$ 315 will automatically place a back-up of all context information it receives to the redundant GGSN$_1$' 345 upon the receipt of each communication. The automatic, and constant, back-up filing in the redundant GGSN$_1$' 345 occupies a significant amount of computing capacity of the support node GGSN$_1$ 315. If the computing capacity associated with filing back-up information could be used in connection with operational tasks, the overall efficiency of the interface system would be increased substantially. The back-up operations are shown by arrows 330 in FIG. 2B.

If, or when, the support node GGSN$_1$ becomes non-operational, the routers 300 and 355 will be informed of the status or detect that non-operational status independently. Thereafter, the routers will begin directing their communications to the redundant support node GGSN$_1$' 345. If possible, the back-up context information in the redundant GGSN$_1$' 345, as supplied by GGSN$_1$ 315, can be used to provide continuity in the connection session. Even with the periodic back-up information, however, re-routing the call connection through the redundant GGSN$_1$' 345 may not be a seamless connection. In fact, context information may be lost or not available in the redundant GGSN$_1$' 345 to allow the call connection to continue. In this situation, the system user would have to re-establish the connection and provide context information to the redundant support node GGSN$_1$' 345. Obviously, requiring the system user to re-establish their connection, and context information, would have a visible impact on the system performance.

As such, it is highly desirable to provide redundancy on important areas of the telecommunications system, but the redundancy scheme used with the system should minimize the overhead burden on the system components and increase the overall efficiency of the system. Further, the redundancy scheme should minimize the need to re-establish the user connection, and associated context information, in a redundant GGSN after a nodal failure or non-operational status. As such, an effective and efficient redundancy scheme is necessary to ensure that the interface system remains operational and performs as efficiently as possible.

SUMMARY OF THE INVENTION

The invention provides a passive redundancy system for context information on a GGSN interface. The system positions broadcast HUB routers on each side of the GGSN, and the system also uses one additional back-up GGSN positioned with each GGSN. The back-up GGSN monitors all communications traffic transmitted to the primary GGSN through the communications from the broadcast HUB nodes coupled to the primary and back-up GGSNs. In this manner the primary GGSN does not have the overhead burden of constantly updating the context information into a redundant GGSN.

Because the back-up GGSN receives and retains the same context information as the primary GGSN, the back-up GGSN can assume responsibility for the communications traffic through the interface in a relatively seamless manner. That is, the back-up GGSN retains the same context information as the primary GGSN because the back-up GGSN monitors traffic, including context information, from the broadcast HUB routers; and, if the primary GGSN becomes non-operational, the back-up GGSN can assume the responsibilities for providing context information just like the primary GGSN without any incurring disconnections, losses of services, or needs to re-establish the connection by the system user.

BRIEF DESCRIPTION OF THE DRAWINGS

The objects and features of the invention will become more readily understood from the following detailed description and appended claims when read in conjunction with the accompanying drawings in which like numerals represent like elements, and in which:

DETAILED DESCRIPTION OF THE PREFERRED EMBODIMENTS

Figure 1:
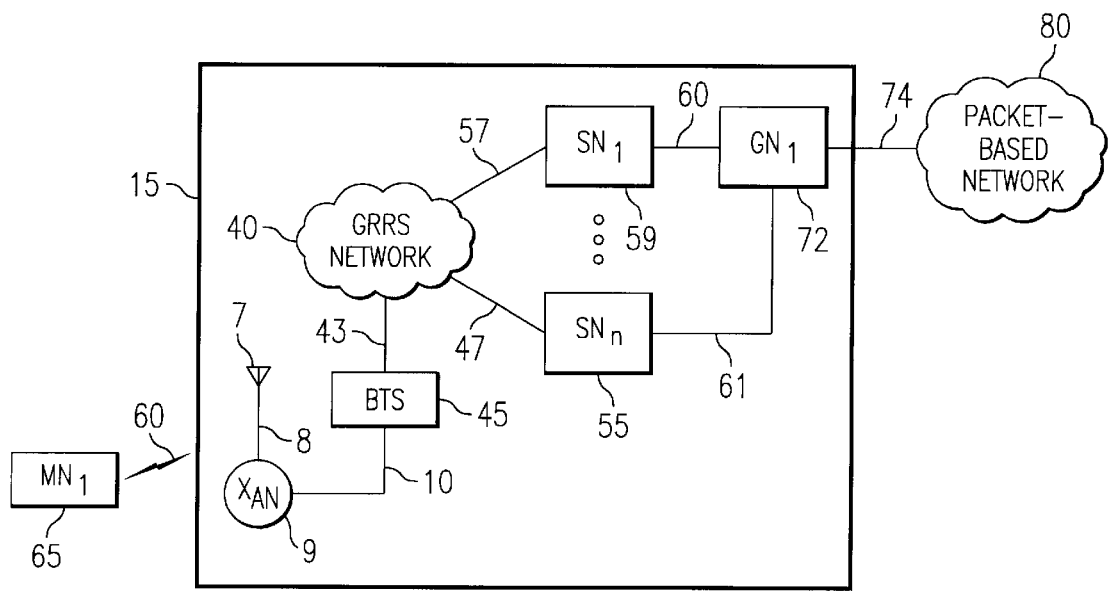
FIG. 1 is a prior art schematic diagram of a wireless and packet-based communications network.
Figure 2B:
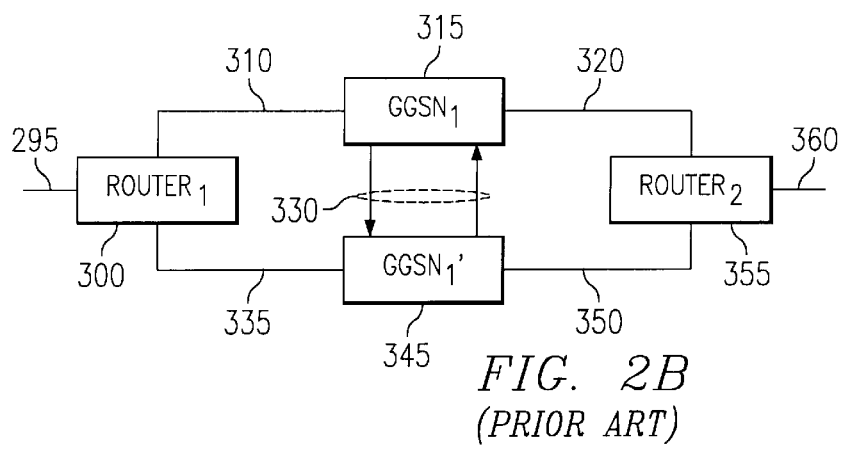
FIG. 2B is a prior art interface redundancy system.
Figure 2A:
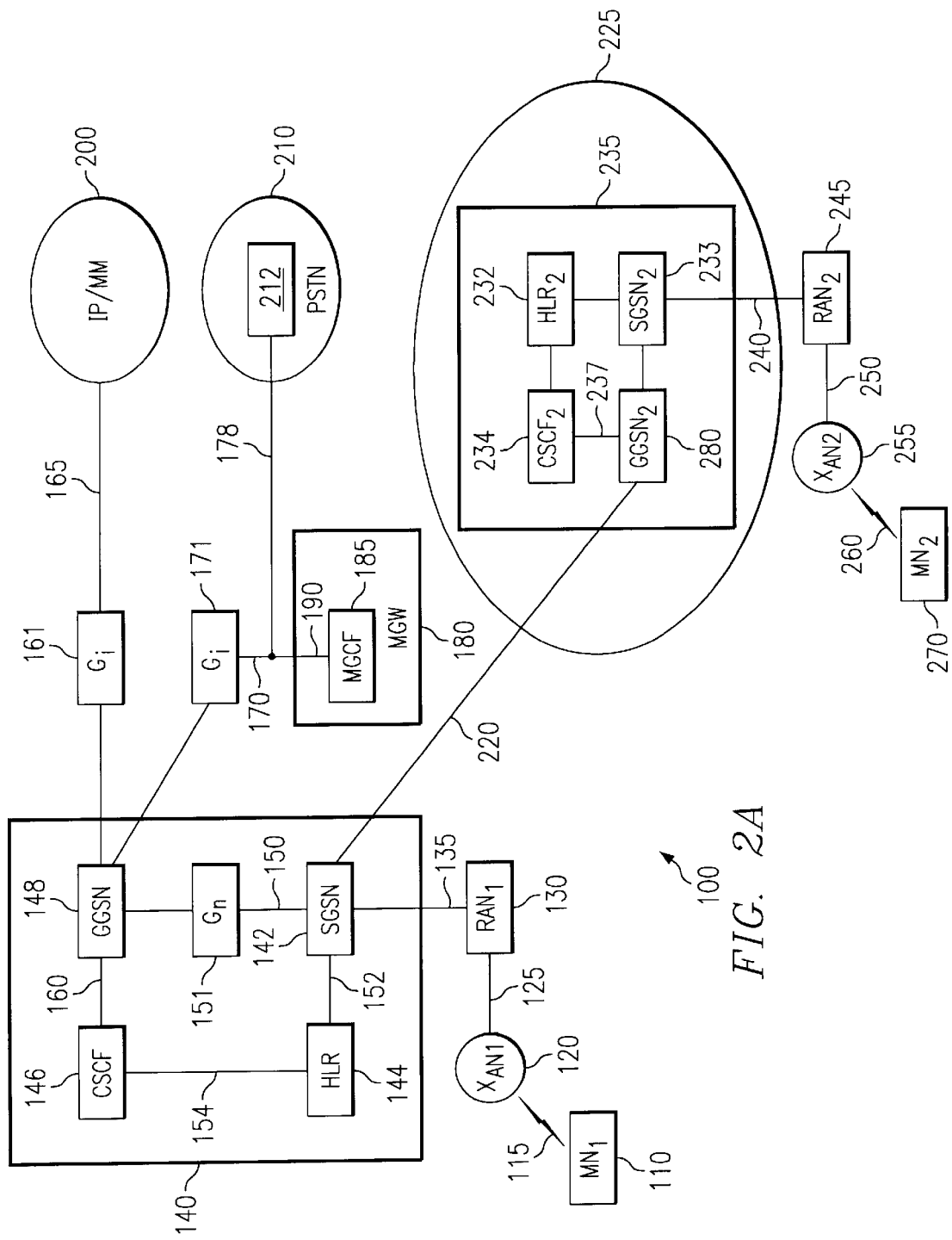
FIG. 2A is a detailed schematic diagram of various communications networks.
Figure 3:
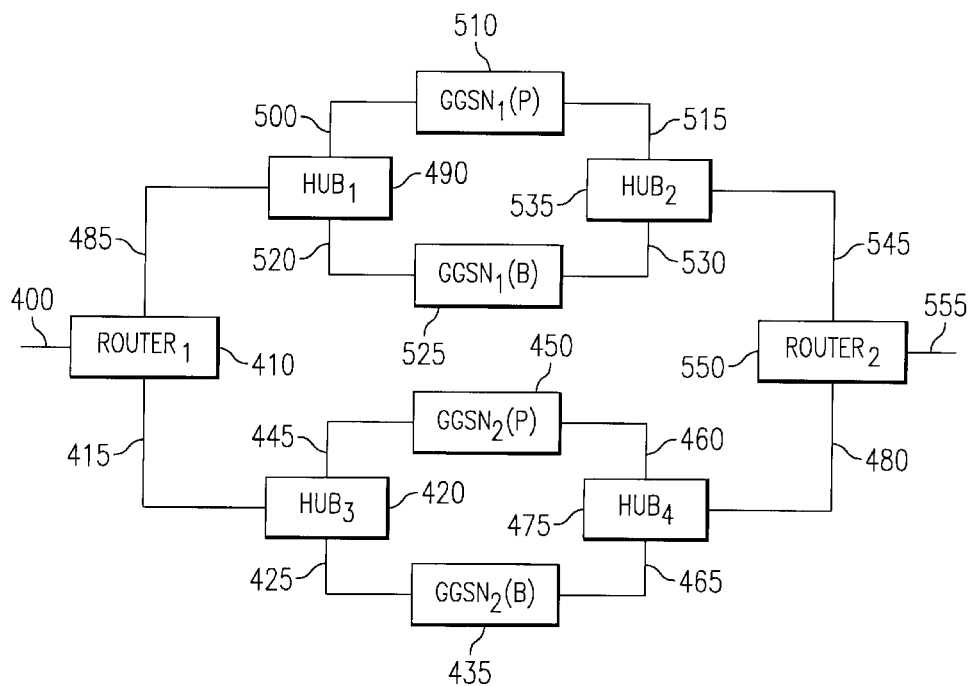
FIG. 3 is a general representation of an embodiment of the present invention; and, FIG. 4 is a general representation of a second embodiment of the present invention.

The systems shown in FIGS. 1 and 2 embody the basic system components for various telecommunications systems. The preferred embodiments of the present invention will be described with regard to an interface between the wireless and packet-based communications network. The present invention, however, can be used in any system where redundancy is desired between two or more routing points or support nodes. Further, as shown in FIG. 3, the present invention is used in the upper and lower halves of the interface system. While each GGSN pairing independently comprises an embodiment of the invention, and the combination of both pairings of GGSN also comprises an embodiment of the invention.

In FIG. 3, Router$_1$ 410 is coupled to signal line 400, and Router$_1$ 410 is a directional router because it will only allow properly addressed packets or information to pass onto the network. The directional router will also transmit the message or information packet to the appropriate destination. Signal line 400 transmits communication signals to and from the directional Router$_1$ 410. Directional Router$_1$ 410 is coupled to HUB$_1$ broadcast router 490 via signal line 485. HUB$_1$ broadcast router 490 is coupled to primary GGSN$_1$(P) 510 via signal line 500, and HUB$_1$ broadcast router 490 is coupled to back-up GGSN$_1$(B) 525 via signal line 520. HUB$_2$ broadcast router 535 is coupled to primary GGSN$_1$(P) 510 via signal line 515, and HUB$_2$ broadcast router 535 is coupled to back-up GGSN$_1$(B) 525 via signal line 530. HUB$_2$ broadcast router 535 is coupled to the directional Router$_2$ 550 via signal line 545, and directional Router$_2$ 550 is coupled to signal line 555 for the transmission of communications signals onto the interface unit.

Directional Router$_1$ 410 is coupled to HUB$_3$ broadcast router 420 via signal line 415. HUB$_3$ broadcast router 420 is coupled to primary GGSN$_2$(P) 450 via signal line 445, and HUB$_3$ broadcast router 420 is coupled to back-up GGSN$_2$ (B) 435 via signal line 425. HUB$_4$ broadcast router 475 is coupled to primary GGSN$_2$(P) 450 via signal line 460, and HUB$_4$ broadcast router 475 is coupled to back-up GGSN$_2$ (B) 435 via signal line 465. HUB$_4$ broadcast router 475 is coupled to the directional Router$_2$ 550 via signal line 480.

The invention in this embodiment operates by directionally routing communications at directional Router$_1$ to GGSN$_1$ pairing 510 and 525 or GGSN$_2$ pairing 450 and 435. If the communication is sent to GGSN$_1$ pairings 510 and 525 the HUB$_1$ broadcast router 490 will send the communication to both GGSN$_1$(P) 510 and GGSN$_1$(B) 525. GGSN$_1$(B) 525 essentially monitors all communications sent to GGSN$_1$(P) 510, and retains the context information of all communications routed to GGSN$_1$(P) 510.

In this manner, if the primary GGSN$_1$(P) support node 510 becomes non-operational, the GGSN$_1$(B) support node 525 can assume responsibility for providing appropriate context information to the out-going communication sent to HUB$_2$ broadcast router 535. The monitoring of communications and context information of the connection is passive because the primary GGSN$_1$(P) 510 need not provide back-up filings to GGSN$_1$(B) 525—which is considered an active redundancy system placing greater overhead obligations on the system.

The overhead on the redundancy system is minimized, but not entirely eliminated. The redundancy system must provide sufficient communications between the primary and back-up support nodes to make sure only one support node is providing interface services and transmitting context information onto the out-going communications of the system. The support node state communications include inquiries and response messages between the primary and back-up support nodes, broadcast status messages from the primary support node to the back-up support node, or inquiry and response messages from the routers or HUB broadcast routers.

There could be additional signal paths between the primary support node and the redundant support node. These signal paths will support the flow of administrative information necessary for coordination of activities between the nodes. Each primary element and its redundant element in each embodiment could use an additional signal path to coordinate activities. This additional signal path may be a separate signal line (not shown) or supported by the existing signal lines.

When a connection is initiated on the interface system, the GGSN support nodes will begin to build tables with the context information. While this is being done on the primary support node GGSN$_1$(P) 510, the back-up table containing the same context information is being created by the back-up support node GGSN$_1$(B) 525. The communications on the call connection are processed with the context information in the table located on GGSN$_1$(P) 510. After receiving an incoming communication, GGSN$_1$(P) 510 manipulates the communication using the context information and transmits the out-going communication to the other side of the interface system.

Essentially, these support node state communications will indicate or announce whether there is a problem, non-operational support node function in the primary GGSN$_1$(P) support node 510, or total nodal failure. One indication of an error condition is when in-coming traffic is sent to the primary support node GGSN$_1$(P) 510, but no out-going traffic is sent or detected. In such a circumstance, the back-up support node GGSN$_1$(B) 525 may identify the possible error situation and query the primary support node 510 to determine if the primary support node is still fully operational. Upon the receipt of an error condition message or the absence of any response, the back-up support node GGSN$_1$(B) will detect the potential error condition.

The back-up node 525 will attempt to correct the problem. If no resolution, the back-up GGSN$_1$(B) 525 will assume responsibility for processing the communications on the interface. Allowing more than one support node to act as the primary interface support component could result in duplicative out-going communications and erroneous transmissions, and system confusion. As such, before the determination to assume primary interface responsibility is made, the back-up GGSN$_1$(B) 525 will only monitor the communications sent to the primary GGSN$_1$(P) 510. After the back-up support node assumes control of the interface operations, the primary support component should not transmit any further out-going communications. The back-up support component should not relinquish control of the interface support until a formal hand-off procedure is effected to an operational primary support node.

In-coming communications from HUB broadcast routers 535, 420 and 475 are treated in the manner described above. These in-coming communications, and the responsibilities of the primary and back-up support nodes, functions in the same manner as described above.

The upper support node pairings GGSN$_1$ 510 and 525 practice the present invention having a back-up GGSN$_1$(B) 525 support node being updated by monitoring communications from the HUB broadcast routes 535 and 490. The back-up GGSN$_1$(B) 525 support node can then assume responsibility for interface processing in a seamless manner.

The lower pairing of GGSN support nodes 450 and 435 with adjacent HUB broadcast routers 420 and 475 also independently practice the invention. By having an additional lower GGSN pairing 450 and 435 coupled to the directional routers 400 and 550 and HUBs 420, 475, 490, 535, the memory requirements for each primary support node may be reduced. Further, the throughput of the interface system can be increased over a single GGSN support node of a similar size and configuration.

Figure 4:
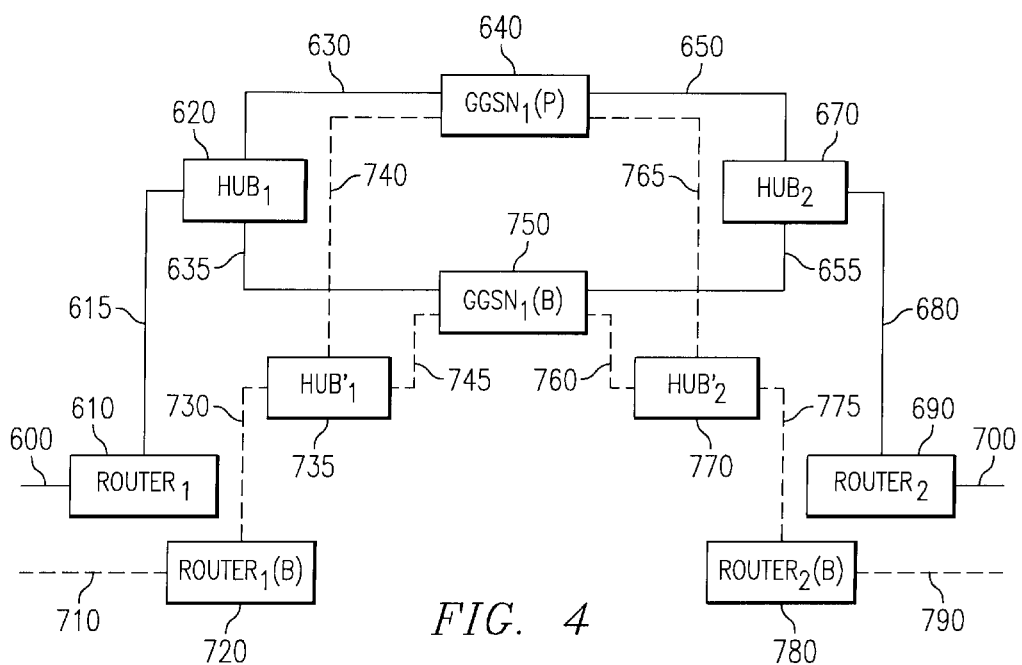

As shown in FIG. 4, an alternative embodiment is shown with redundant directional routers and HUB broadcast routers. In FIG. 4, directional Router$_1$ 610 is coupled to signal line 600. Signal line 600 transmits communication signals to and from the directional Router$_1$ 610. Directional Router$_1$ 610 is coupled to HUB$_1$ broadcast router 620 via signal line 615. HUB$_1$ broadcast router 620 is coupled to primary GGSN$_1$(P) 640 via signal line 630, and HUB$_1$ broadcast router 620 is coupled to back-up GGSN$_1$(B) 750 via signal line 635.

HUB$_2$ broadcast router 670 is coupled to primary GGSN$_1$ (P) 640 via signal line 650, and HUB$_2$ broadcast router 670 is coupled to back-up GGSN$_1$(B) 750 via signal line 655. HUB$_2$ broadcast router 670 is coupled to the directional Router$_2$ 690 via signal line 680, and directional Router$_2$ 690 is coupled to signal line 700 for the transmission of communications signals onto the interface unit.

Also part of this embodiment is the redundant back-up directional routers 720 and 780 and associated redundant HUB broadcast routers 735 and 770 shown in FIG. 4. In this redundant communication path, Router$_1$(B) 720 is coupled to signal line 710. Signal line 710 transmits communication signals to and from the directional Router$_1$ (B) 720. Directional Router$_1$(B) 710 is coupled to back-up HUB$_1$' broadcast router 735 via signal line 730. HUB$_1$' broadcast router 735 is coupled to primary GGSN$_1$(P) 640 via signal line 740, and HUB$_1$' broadcast router 735 is coupled to back-up GGSN$_1$(B) 750 via signal line 745. HUB$_2$' broadcast router 770 is coupled to primary GGSN$_1$(P) 640 via signal line 765, and HUB$_2$' broadcast router 770 is coupled to back-up GGSN$_1$(B) 750 via signal line 760. HUB$_2$' broadcast router 770 is coupled to the Router$_2$ (B) 780 via signal line 775, and directional Router$_2$(B) 780 is coupled to signal line 790 for the transmission of communications signals onto the interface unit.

This embodiment operates substantially the same as the embodiment in FIG. 4 except the directional Router$_1$ 610 and directional Router$_2$ 690 have redundant back-up directional routers 720 and 780. Further, each broadcast HUB router 635 and 670 also has a redundant HUB router 735 and 770. Essentially, each router node 610, 620, 670 and 690 on the interface system has a redundant element that provides further redundancy through back-up components on the interface system.

In FIG. 4, the directional Router$_1$ 610 will operate with HUB$_1$ broadcast HUB router 620, HUB$_2$ broadcast HUB router 670 and Router$_2$ 690 during normal operation. These elements will provide the interface redundancy with the GGSN pairing 640 and 750 as described above. If any one of the routing elements 610, 620, 670 or 690 becomes non-operational, back-up routing devices can be used to transmit communications with directional back-up routers 720 or 780 to the GGSN pairing 640 and 750, or with the back-up HUB broadcast routers 735 or 770.

When one of the primary routers needs to be supported by a redundant component, the entire router network can be replaced with a redundant network or the individual routing devices on one side of the interface may be replaced with an individual device. For instance, if HUB$_1$ broadcast router 620 become non-operational, the back-up directional Router$_1$(B) 720 and HUB$_1$ 735 on the left side of the interface can assume routing responsibility to provide adequate redundancy, or all the back-up routing devices. In this example, directional routers 720 and 780 and/or HUB broadcast routers 735 and 770 can assume responsibility for routing responsibility.

Alternative embodiments of the interface redundancy system include the use of the redundancy system in a selective updating of context information between primary and back-up components. Further, in another embodiment, certain manual redundancy can be supported in the present invention between primary and back-up elements. Further, combinations of the individual redundant features from the FIG. 3 embodiment can be combined with individual redundant features from the FIG. 4 embodiment. Further, a table of information can be maintained between the primary and redundant elements using background capacity on one or more of the support nodes to enhance the operation of the invention. While the invention has been particularly shown and described with respect to preferred embodiments, it will be readily understood that minor changes in the details of the invention may be made without departing from the spirit of the invention.

I claim:

1. A redundancy system for an interface system between two communications systems, comprising:

a first hub broadcast router coupled to a first interface support component, said first hub broadcast router delivers context information to the first interface support component;

a second hub broadcast router coupled to the first interface support component, said second hub broadcast router delivers context information to the first interface component; and, a second interface support component coupled to the first and second hub broadcast routers, said first and second hub broadcast routers delivers said context information to the second interface support component for retention of said context information and said second interface support component provides a redundant interface support component in the event the first interface support component becomes non-operational.

2. The redundancy system for an interface system set forth in claim 1 further comprising:

a first directional router coupled to the first hub broadcast router, said first directional router transmits appropriately addressed communications to the first hub broadcast router.

3. The redundancy system for an interface system set forth in claim 2 further comprising:

a first back-up directional router coupled to a first back-up hub broadcast router, said first back-up directional router transmits appropriately addressed communications to the first back-up hub broadcast router if the first directional router or first hub broadcast router becomes non-operational.

4. The redundancy system for an interface system set forth in claim 1 further comprising:

a second directional router coupled to the second hub broadcast router, said second directional router transmits appropriately addressed communications to the second hub broadcast router.

5. The redundancy system for an interface system set forth in claim 4 further comprising:

a second back-up directional router coupled to a second back-up hub broadcast router, said second back-up directional router transmits appropriately addressed communications to the second back-up hub broadcast router if the second directional router or second hub broadcast router becomes non-operational.

6. The redundancy system for an interface system set forth in claim 1 further comprising:

a first directional router coupled to the first hub broadcast router, said first directional router transmits appropriately addressed communications to the first hub broadcast router, and a second directional router coupled to the second hub broadcast router, said second directional router transmits appropriately addressed communications to the second hub broadcast router.

7. The redundancy system for an interface system set forth in claim 6 further comprising:

a first back-up directional router coupled to a first back-up hub broadcast router, said first back-up directional router transmits appropriately addressed communications to the first back-up hub broadcast router if the first directional router or first hub broadcast router becomes non-operational.

8. The redundancy system for an interface system set forth in claim 6 further comprising:

a second back-up directional router coupled to a second back-up hub broadcast router, said second back-up directional router transmits appropriately addressed communications to the second back-up hub broadcast router if the second directional router or second hub broadcast router becomes non-operational.

9. The redundancy system for an interface system set forth in claim 6 further comprising:

a first back-up directional router coupled to a first back-up hub broadcast router, said first back-up directional router transmits appropriately addressed communications to the first back-up hub broadcast router if the first directional router or first hub broadcast router becomes non-operational; and, a second back-up directional router coupled to a second back-up hub broadcast router, said second back-up directional router transmits appropriately addressed communications to the second back-up hub broadcast router if the second directional router or second hub broadcast router becomes non-operational.

10. A redundancy system for an interface system between two communications system, comprising:

a first hub broadcast router coupled to a first interface support component and a second hub broadcast router coupled to the first interface support component, said first and second hub broadcast routers delivers context information to the first interface support component;

a second interface support component coupled to the first and second hub broadcast routers, said first and second hub broadcast routers delivers said context information to the second interface support component to support redundancy of the first interface support component;

a third hub broadcast router coupled to a third interface support component and a fourth hub broadcast router coupled to the third interface support component, said third and fourth hub broadcast router delivers a second set of context information to the third interface support component;

a fourth interface support component coupled to the third and fourth hub broadcast routers, said third and fourth hub broadcast routers delivers said second set of context information to the fourth interface support component to support redundancy of the third interface support component.

11. The redundancy system for an interface system set forth in claim 10 further comprising:

a first directional router coupled to the first and third hub broadcast routers, said first directional router transmits appropriately addressed communications to the first or the third hub broadcast router.

12. The redundancy system for an interface system set forth in claim 11 further comprising:

a first back-up directional router coupled to a first back-up hub broadcast router, said first back-up directional router transmits appropriately addressed communications to the first back-up hub broadcast router if the first directional router or first hub broadcast router becomes non-operational.

13. The redundancy system for an interface system set forth in claim 10 further comprising:

a second directional router coupled to the second and fourth hub broadcast routers, said second directional router transmits appropriately addressed communications to the second and fourth hub broadcast router.

14. The redundancy system for an interface system set forth in claim 13 further comprising:

a second back-up directional router coupled to a second back-up hub broadcast router, said second back-up directional router transmits appropriately addressed communications to the second back-up hub broadcast router if the second directional router or second hub broadcast router becomes non-operational.

15. The redundancy system for an interface system set forth in claim 10 further comprising:

a first directional router coupled to the first and third hub broadcast router, said first directional router transmits appropriately addressed communications to the first or the third hub broadcast router, and a second directional router coupled to the second and fourth hub broadcast router, said second directional router transmits appropriately addressed communications to the second and fourth hub broadcast router.

16. The redundancy system for an interface system set forth in claim 15 further comprising:

a first back-up directional router coupled to a first back-up hub broadcast router, said first back-up directional router transmits appropriately addressed communications to the first back-up hub broadcast router if the first directional router or first hub broadcast router becomes non-operational.

17. The redundancy system for an interface system set forth in claim 15 further comprising:

a second back-up directional router coupled to a second back-up hub broadcast router, said second back-up directional router transmits appropriately addressed communications to the second back-up hub broadcast router if the second directional router or second hub broadcast router becomes non-operational.

18. The redundancy system for an interface system set forth in claim 15 further comprising:

a first back-up directional router coupled to a first back-up hub broadcast router, said first back-up directional router transmits appropriately addressed communications to the first back-up hub broadcast router if the first directional router or first hub broadcast router becomes non-operational; and, a second back-up directional router coupled to a second back-up hub broadcast router, said second back-up directional router transmits appropriately addressed communications to the second back-up hub broadcast router if the second directional router or second hub broadcast router becomes non-operational.

19. A method of providing redundancy of support components in an interface system between two communication systems comprising the steps of:

receiving a communication at a first directional router;

transmitting the communication to a first hub broadcast router coupled to the directional router;

providing the communication to a first interface support component coupled to the first hub broadcast router, said first interface support component having retained context information for use in processing the communication;

providing the communication to a second interface support component coupled to first hub broadcast router, said second interface support component having retained context information for use in processing the communication if the first interface support component becomes non-operational.

20. The method of providing redundancy of support components in an interface system between two communication systems as set forth in claim 19, further comprising the steps of:

detecting an error condition in the first interface support component.

21. The method of providing redundancy of support components in an interface system between two communication systems as set forth in claim 20, further comprising the steps of:

attempting to correct the error condition in the first interface support component.

22. The method of providing redundancy of support components in an interface system between two communication systems as set forth in claim 21, further comprising the steps of:

transferring primary responsibility for interface support from the first interface support component to the second interface support component.

23. The method of providing redundancy of support components in an interface system between two communication systems as set forth in claim 19, further comprising the steps of:

detecting an error condition in the first interface support component;

attempting to correct the error condition in the first interface support component; and, transferring primary responsibility for interface support from the first interface support component to the second interface support component.

* * * * *